G. W. HENRY, Jr.
ELECTRIC FLASHER.
APPLICATION FILED FEB. 28, 1914.
1,187,315.
Patented June 13, 1916.
2 SHEETS—SHEET 1.
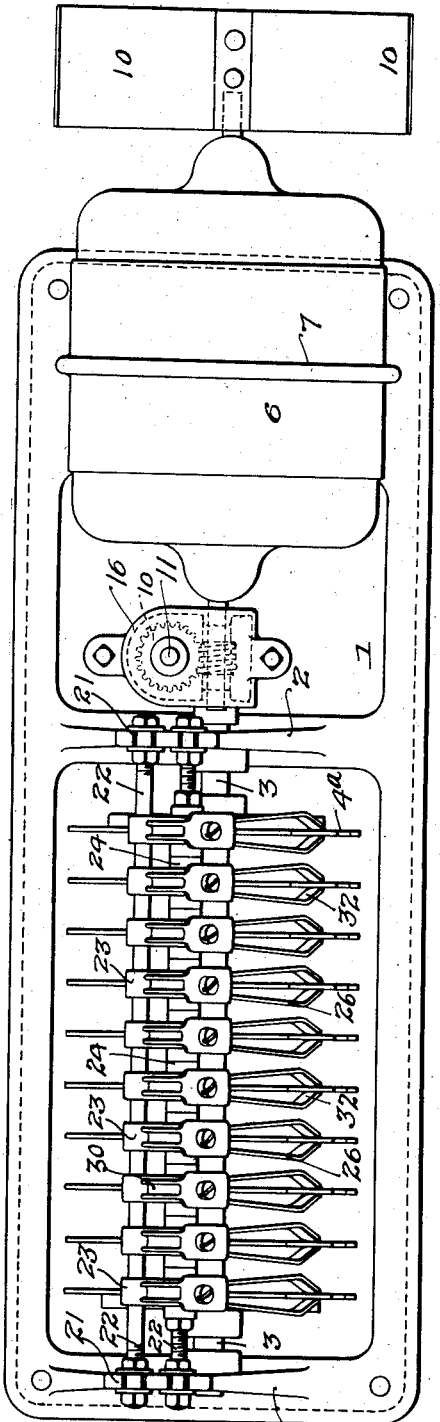
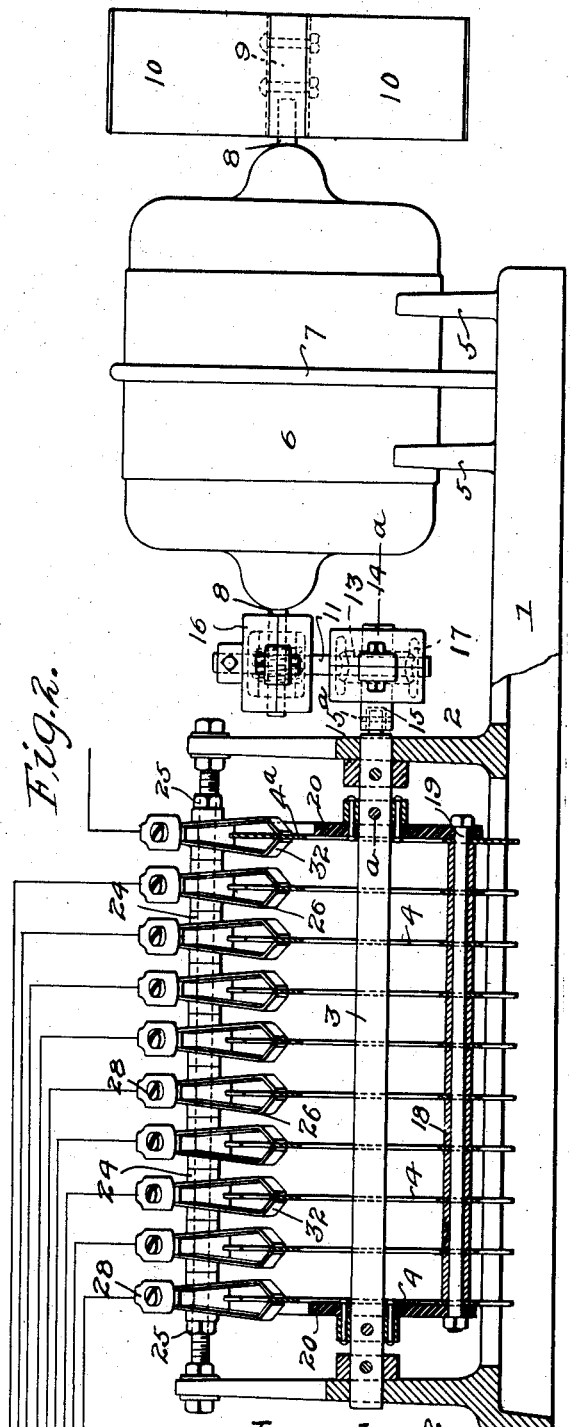
Inventor—
George W. Henry Jr.
by his Attorneys.

G. W. HENRY, Jr.
ELECTRIC FLASHER.
APPLICATION FILED FEB. 28, 1914.
1,187,315.
Patented June 13, 1916.
2 SHEETS—SHEET 2.
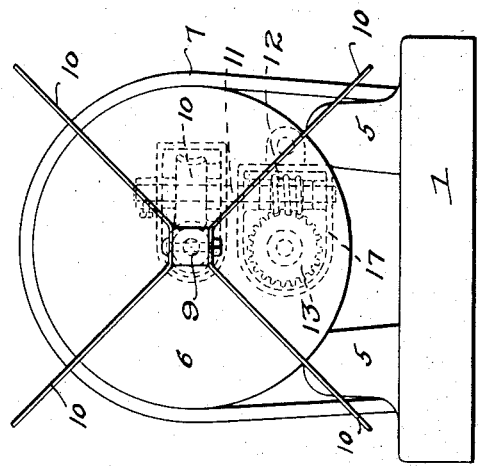
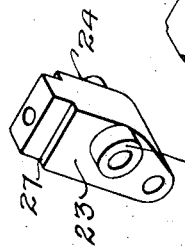
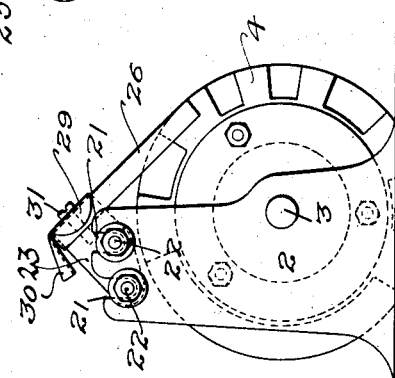
Witnesses:
Walter Chism
Willet Burrows
Inventor:
George W. Henry Jr.
By his Attorneys
Simon & Houser

UNITED STATES PATENT OFFICE.

GEORGE W. HENRY, JR., OF PHILADELPHIA, PENNSYLVANIA.

ELECTRIC FLASHER.

1,187,315.   Specification of Letters Patent.   Patented June 13, 1916.

Application filed February 28, 1914. Serial No. 821,751.

*To all whom it may concern:*

Be it known that I, GEORGE W. HENRY, Jr., a citizen of the United States, residing in Philadelphia, Pennsylvania, have invented certain Improvements in Electric Flashers, of which the following is a specification.

One object of my invention is to improve the construction of flashing mechanism for electric signs or pictures so as to insure accuracy in operation.

A further object of the invention is to simplify the construction of a flasher used for this purpose and to provide for the ready assembling of the parts as will be fully described hereinafter, reference being had to the accompanying drawings, in which:—

Figure 1, is a plan view of my improved electric flasher; Fig. 2, is a side view partly in section; Fig. 3, is a left hand end view; Fig. 4, is a right hand end view; Fig. 5, is a sectional view on the line $a$—$a$, Fig. 2; Fig. 6, is a perspective view of one of the terminals; Fig. 7, is a perspective view of the brush holder; Fig. 8, is a perspective view of one of the terminal plates; Fig. 9, is a perspective view of one of the notched disks; Figs. 10 and 11 are views of a modification of the brush holder; and Fig. 12, is a view of another form of brush holder.

Referring to the drawings, 1 is the base of the apparatus having, in the present instance, integral bearings 2 in which is mounted the shaft 3 carrying the notched disks 4 and the plain disk $4^a$. The electric motor 6 is mounted in saddles 5 and fastened to the base by a strap 7.

To one end of the armature shaft 8 of the motor is attached a hub 9 to which are secured blades 10 forming a fan which acts as a governor for the motor. The blades are made in two sections, as illustrated in Fig. 4. Each section is made of sheet metal bent as shown, and rivets or bolts secure the sections to the hub 9. When the fan is assembled the four blades are spaced a given distance apart, but this construction of the fan may be modified if desired. On the opposite end of the armature shaft 8 is a worm, which meshes with a worm wheel 10 on a vertical shaft 11. The two shafts have their bearings in a casing 16 which incloses the gearing. On the lower end of the vertical shaft 11 is a worm 12 which meshes with a worm wheel 13 having a long hub 14, as shown in Fig. 5; the hub and the shaft 11 have their bearings in a casing 17 inclosing the gearing. On one end of the hub is a socket 15 into which extends one end of the shaft 3 which is loosely secured therein by a pin $15^a$. By this construction the motor need not be accurately alined with the shaft 3.

The disks 4 and $4^a$ are made as shown in Fig. 9, having a large opening in the center to clear the shaft 3 and spaced a given distance apart by sleeves 18 through which pass bolts 19 extending through heads 20 of nonconducting material at each end of the shaft 3, as shown in Fig. 2. These heads are secured to the shaft by pins in the present instance, making a rigid construction.

The bearings 2 are extended and are notched at 21 to receive the two parallel rods 22 which are held to the bearings by nuts, or other suitable fastenings, and mounted on the rods are contact carriers 23 of non-conducting material. The forward bearings 24 of these contact carriers are of such a length that one bearing abuts another and, when they are assembled on the rods, the nuts 25 firmly secure several carriers on the rod. The upper end of each contact carrier is shouldered as at 27 to receive the U-shaped contact 26, and mounted on each contact carrier is a terminal plate 28 having wings 29 which extend over the sides of the contacts 26, there being a U-shaped extension 30 to which the wire is attached by soldering and bending over the flanges thereof. A screw 31 confines the plate 28 to its contact carrier. This makes a simple and inexpensive device, which is easily adjusted and which can be quickly duplicated when necessary. The contacts are U-shaped in form, as illustrated in Fig. 6, and the ends 32, which form the brushes, are bent toward each other. The disks 4 and $4^a$ travel between the brushes of each contact, as illustrated in Figs. 1 and 2. By notching the plates 4, as illustrated in Fig. 3, the contacts are made and broken as the shaft 3 is rotated and by notching the plates in any given manner the flashing of the electric lights can be controlled so that a picture or sign can be illuminated as desired.

In assembling the disks on the shaft, I make the openings in the disks considerably larger than the shaft and the heads are made of insulating material, so that when the disks are coupled to the heads as shown, they are insulated from the shaft, and I make each of the contact carriers of insulating material, so that when they are assembled on the rods, they are insulated from the rods, and from the frame. The contact carrier of insulating material and spacing sleeves may be made integral, as shown in Fig. 7, or the contact carriers 23ᵃ may be of flat insulating material, as shown in Figs. 10 and 11, and metallic sleeves 24ᵃ may extend from one contact carrier to the other. In this instance, pins 27ᵃ are used to support the contacts 26 in place of the shoulders on the carrier. In Fig. 12, I have shown a flat carrier 24ᵇ of non-conducting material having a single square hole to receive a square supporting rod.

A device of the character above described must be accurate in order to give satisfactory results and with my improved construction the cost of manufacture is greatly reduced. The parts can be assembled with but little machine work and it can be installed with any number of disks, according to the picture or sign which it is desired to produce in lights.

I claim:

1. The combination of a base having bearings; a shaft mounted in the bearings; a plain disk and a series of notched disks, said disks being spaced apart on the shaft and insulated therefrom; a rod running parallel with the shaft; contact carriers of non-conducting material located on the rod, one contact carrier abutting another; and means for holding the contacts together and on the rod; contacts secured to each carrier and engaging their respective disks, those engaging the notched disks being located in line with the notches; and means for turning the shaft.

2. The combination of a base; bearings thereon; a shaft mounted in the bearings; a plain disk and notched disks located on the shaft; means for spacing the disks apart; two parallel rods, also mounted in the bearings; a series of carriers mounted on the rods; means for locking the carriers together; contacts mounted on each carrier and bearing on the disks, those engaging the notched disks being located in line with the notches; and means for rotating the shaft.

3. The combination of a base; bearings thereon; a shaft; two heads on said shaft; a plain disk and a series of notched disks having open centers and secured to said heads and insulated from the shaft; means for spacing the disks apart; a rod running parallel with the shaft; insulated contact carriers on the rod; and a U-shaped contact on each carrier, said contacts being made of sheet metal and having their ends turned in toward each other to form brushes and bearing upon the disks near their peripheries.

4. The combination of a base; bearings thereon; a shaft mounted in the bearings; a plain disk and notched disks spaced apart and arranged to turn with the shaft; a rod extending parallel with the shaft; a series of insulated carriers mounted on the rod; means for securing the carriers on the rods; a U-shaped contact extending around each carrier and bearing upon the disks in line with the notches; terminal plates mounted on the carriers and securing the contacts in place, said terminal plates having means for connecting the wires thereto; and means for rotating the shaft.

5. The combination of a contact carrier; means for supporting the carrier; said carrier having a shouldered portion; a U-shaped contact passing around the carrier and resting on the shoulders; a terminal plate having means for holding the contact in place and having means for securing the wire thereto.

6. The combination of a base; bearings thereon notched at the upper end; a shaft mounted in the bearings; a plain disk and a series of notched disks spaced apart and locked on the shaft; two parallel rods resting in the notches of the bearings and secured thereto; a series of contact carriers on the rods; U-shaped contacts mounted on the contact carriers and having inturned ends bearing against the disks near their peripheries; terminal plates having lips extending over the rear ends of the contact carriers and having a U-shaped extension to engage the end of a wire; means for securing the plate to the contact carrier, thus securing the carrier to the contacts; and means for driving the shaft.

7. The combination of a base, bearings thereon; a shaft mounted in the bearings; means for driving said shaft; heads of insulating material on said shaft; a plain disk and a series of notched disks having open centers and secured to the said heads and clear of the shaft; a rod on the bearings; carriers of insulating material on the rod; and a U-shaped contact on each carrier bearing against a disk near its periphery.

In testimony whereof, I have signed my name to this specification, in the presence of two subscribing witnesses.

GEORGE W. HENRY, Jr.

Witnesses:
 WM. E. SHUPE,
 WM. A. BARR.